Patented Oct. 8, 1929

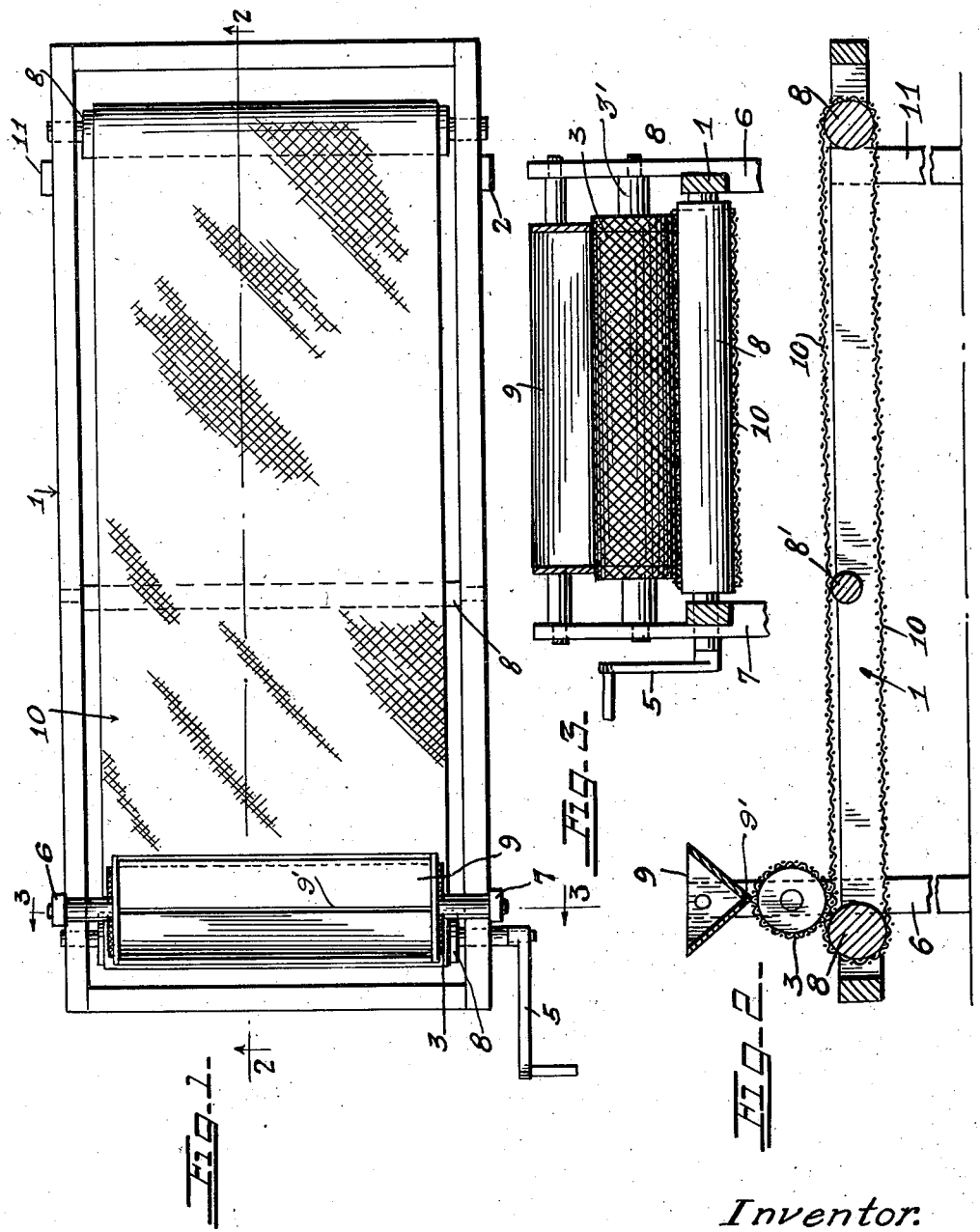

1,730,398

UNITED STATES PATENT OFFICE

CHARLES WALTERHOUSE, OF DAVISON, MICHIGAN

HENHOUSE CLEANER

Application filed December 16, 1926. Serial No. 155,320.

The present invention relates to hen house cleaners and has for its principal object to provide an article of this character adapted to be arranged beneath the chicken roost and upon which the droppings deposited by the chickens during the roosting may be collected and disposed of in an effective, easy and clean manner.

A further object is to accomplish this result by providing an endless webbing mounted upon a plurality of rollers beneath the roost and associated with which is a sprinkler for sprinkling a quantity of granulated material upon the webbing to form a loose coating for the same whereby to prevent the droppings from adhering upon the surface thereof.

Another object is to provide a device of this character of simple and practical construction, inexpensive to manufacture, install and maintain in operation and otherwise well adapted for the purpose for which the same is intended.

Other objects and advantages reside in the special construction and combination of the various elements comprising the invention, reference being had to the accompanying drawings forming a part hereof, wherein:—

Figure 1 is a top plan view,

Figure 2 is a vertical longitudinal sectional view taken substantially along a line 2—2 of Figure 1, and Figure 3 is an end view.

Referring now to the drawing in detail, I provide a frame comprising horizontally disposed frame members 1 supported by a pair of legs at each end thereof, said legs being indicated by the numerals 2, 6, 7 and 11.

The legs 6 and 7 extend above the frame 1 in spaced parallel relation with a drum 3 mounted therebetween, the ends of the drum being rotatably supported by stub shafts 3' journaled for rotation in the respectively upwardly extending ends of the legs. The drum is provided with a covering of relatively fine mesh screening or other foraminous material as indicated in Figures 2 and 3 of the drawings.

Above the drum is arranged a trough shaped hopper 9 having its opposite end supported at the upper ends of the legs 6 and 7 said hopper extending longitudinally with respect to the drum and having a slotted discharge opening 9' formed in the base or along the lower edge thereof. As will be observed from an inspection of Figure 2 of the drawings the lower edge of the hopper is arranged in close proximity with the surface of the drum.

Adjacent each end of the frame 1 is rotatably mounted a roller 8 extending transversely of the frame and about each of which is carried an endless canvas webbing 10, a similar roller 8' being also disposed intermediate the ends of the frame in order to support the webbing in a substantially horizontal position throughout its upper surface. The roller 8 at the end of the frame adjacent the drum 3 is disposed in a position for supporting the canvas webbing so as to cause the engagement thereof by the surface of the drum.

One of the rollers is provided with a crank handle 5 through the operation of which the webbing may be moved about the rollers and through the engagement of the webbing with the drum to likewise cause the rotation of the same.

The hopper 9 may be filled with a quantity of granulated material, such as sand, ashes or lime, ground sufficiently fine to enable the same to pass through the opening 9' in the base of the hopper and enter the drum through the screen cover thereon. As the endless webbing 10 is moved in a predetermined direction through the operation of the crank the granulated material will thereby be deposited on the upper surface of the webbing to form a substantial coating for the same.

The granulated material is deposited from the hopper through the screening of the drum and into the drum and then upon the webbing, attention being called to the fact that the drum is disposed in constant engagement with the webbing, so that the material in the drum is prevented from passing therefrom while the drum is idle. The size of the mesh of the screen on the drum is suitable to prevent the material from the hopper from advancing freely through the uppermost side of the drum to the interior thereof and accordingly will be collected in the drum by reason of the manner in which the drum rests upon the upper surface of the webbing. However, as soon as the rollers 8 are turned to operate the webbing, the material from the drum will be discharged therefrom so as to form a fine coating on the upper surface of the webbing. This construction prevents the material from being deposited directly upon the webbing from the hopper, and it is apparent that without the drum, the material from the hopper would be deposited in a pile at one end of the webbing and not uniformly spread over the surface thereof.

By reason of the loose material carried by the webbing the droppings from the poultry will be prevented from adhering thereto and the same will consequently fall from the webbing at the end of the frame as the webbing is moved about the roller. A suitable receptacle may be arranged beneath the end of the webbing within which the droppings and loose material may be deposited.

It is obvious that the invention is susceptible of various changes and modifications, without departing from the spirit or scope of the invention or sacrificing any of its advantages, and I accordingly claim all such forms of the device to which I am entitled.

Having thus described my invention, what I claim as new is:

1. In a device of the class described, a frame having an endless webbing arranged for movement thereon, a foraminous drum mounted above the webbing in contact therewith and adapted to sprinkle a quantity of granulated material thereupon during the movement of the webbing and operable by reason of the contacting engagement between the drum and the webbing to retain the material in the drum while the webbing is idle, and a hopper disposed above the drum adapted to feed the granulated material to the interior of the same.

2. In a device of the class described, a frame having rollers mounted at each end thereof and adapted to movably support an endless webbing, one of said rollers having a crank handle attached thereto for the operation of the webbing, a drum having a covering of foraminous material mounted above the upper surface of the webbing with the surface of the drum arranged in contact with the webbing, and a trough shaped hopper disposed above the drum and extending longitudinally with respect thereto, the bottom edge of said hopper having a discharge opening formed therein and arranged in close proximity with the surface of the drum whereby material from the hopper may be deposited in the interior of said drum.

CHAS. WALTERHOUSE.